Nov. 14, 1933.   L. T. ROBINSON   1,935,417
SOUND RECORDING
Filed May 30, 1930
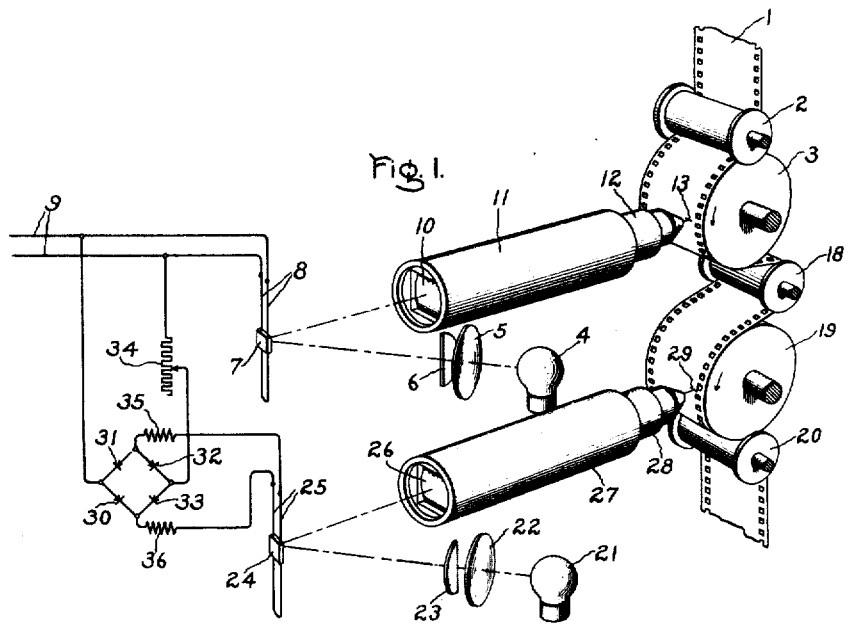
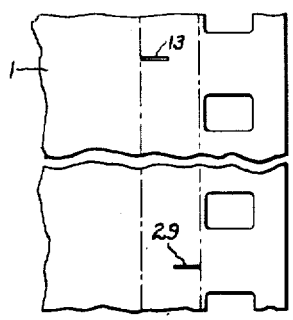
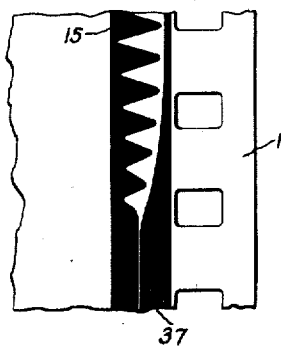
Inventor:
Lewis T. Robinson
by Charles E. Mullen
His Attorney.

Patented Nov. 14, 1933

1,935,417

UNITED STATES PATENT OFFICE 1,935,417

SOUND RECORDING

Lewis T. Robinson, Schenectady, N. Y., assignor to General Electric Company, a corporation of New York Application May 30, 1930. Serial No. 457,667

13 Claims. (Cl. 179—100.3)

My invention relates to the photographic recording of sound. In the reproduction of sound from a photographic film record as usually made, whether the record be of the variable density type or of the variable width type, there is usually in addition to the recorded sound a certain amount of so-called "ground noise". Such noise being of a substantially constant intensity or volume is not objectionably noticeable as long as the recorded sound is of the usual volume, but whenever the recorded sound volume reaches a low value the ground noise in comparison becomes the more prominent. Ground noise is particularly noticeable for example, during various soft passages in musical reproductions and also before the recorded sound comes on and after it ceases. It is known that a considerable part of the ground noise heard when a film record is being reproduced is a result of striations in and scratches and dirt on the relatively clear portions of the record where the light passes freely into the photoelectric cell.

It is the object of my invention to provide an improved method and apparatus for the recording of sound, whereby when the record is reproduced the amount of ground noise shall be greatly reduced if not substantially eliminated.

My invention will be better understood from the following description taken in connection with the accompanying drawing, and its scope will be pointed out in the appended claims.

Referring to the drawing, Fig. 1 shows apparatus illustrating one embodiment of my invention; Figs. 2 and 3 are enlarged views of fragments of film showing respectively the light spots by which the film is exposed and the exposures made by the light spots.

In Fig. 1, I have shown a light sensitive member 1 comprising a film of the motion picture type arranged to pass under the pressure roll 2 and over the supporting drum 3. It is immaterial whether the drum is mounted for free rotation and is moved by the film or whether it is positively driven by suitable mechanism so as to move the film. Light from a suitable source 4 passes through the condensing lens 5, past the diaphragm 6 by which a working edge is given to the exposing light beam and is focused on the mirror 7 of an oscillograph galvanometer of which, for the sake of simplicity, I have shown only the moving system comprising the bifilar conductors 8 connected to the circuit 9. The light reflected from the mirror 7 is condensed by the cylindrical lens 10 shown arranged at one end of the tube 11 within which is a narrow horizontal slit (not shown). The light passing the slit is imaged by means of the microscope objective 12 in the form of the narrow light band 13 on the film. The circuit connections 9 lead to a suitable sound pickup device (not shown), preferably through suitable thermionic amplifying devices in the well understood manner. The apparatus thus far described is similar to that commonly employed for making a variable width sound record, it being understood that the mirror is vibrated in response to the electrical impulses received from the pickup device and causes the light beam engaging the film to vibrate horizontally in a manner to form a variable width sound record such for example as that represented at 15 in Fig. 3. It is usual in making records of this type to adjust the mirror so that when there is no sound being recorded approximately one-half of the sound track is exposed. When the sound comes on the mirror vibrates in response to the alternating current supplied to the galvanometer corresponding to the sound waves so that the light beam engaging the film swings equally on both sides of the center line of the sound track. When there is no sound being recorded or when the sound is of low volume, the unexposed portion of the sound track is clear after development and gives rise to the objectionable ground noise.

In accordance with my invention I cause a part of this unexposed portion of the sound record to be given an exposure whereby when the film is developed the sound track shall have a black band which forms an envelope for the beads of the recorded waves. Consequently during those times at which there is no sound the entire width of the film is nearly or entirely black.

For giving the film such an additional exposure, I have shown the film as passing from drum 3 under roll 18, over drum 19 and under roll 20. Drum 19 is preferably similar to drum 3 and like that drum may either be driven by the film or may drive the film, it being essential however that the film shall move with the same speed at each drum and that the loop occupied by the roll 18 between the drums shall remain of constant size. For giving the film the above mentioned additional exposure, an optical system is employed similar to that already described. It is shown as comprising the lamp 21, condensing lens 22, the diaphragm 23, the mirror 24 supported by the the bifilar conductors 25 of a second oscillograph galvanometer similar to that described above, a cylinder lens 26 in the tube 27 in which there is also a light slit (not shown) the image of which is focused on the film by the objective 28 forming the narrow light band 29. The galvanometer in this case is adjusted so that when there is no sound being recorded all, or approximately all, of the other half of the sound track is exposed to light from lamp 21. The conductors 25 of the second galvanometer connect with the circuit connections 9 through a rectifying apparatus shown as comprising the four contact rectifiers 30, 31, 32, 33, such for example as those described and claimed in the Grondahl Patent 1,649,335, August 23, 1927. Two opposite points of the rectifying apparatus connect with the circuit 9 through the resistance 34 and two other opposite points connect with the conductors 25 of the second galvanometer through the inductances 35 and 36.

With apparatus such as described above, electrical impulses received by the connections 9 corresponding to sound waves actuate the mirror 7 to record the impulses in the usual well known manner. These impulses in passing through the rectifier apparatus and the inductances 35 and 36, are rectified and are so ironed out that the mirror 24 of the second galvanometer is deflected only in accordance with the amplitude or volume of the sound being recorded producing the exposed or black portion 37 on the film. The inductances 35 and 36 not only smooth out the current variations but introduce a certain lag in the response and this lag is approximately equal to the time taken by the film to pass from one exposing light beam to the next. By suitably varying the inductances 35 and 36 or by varying the size of the film loop engaged by the roll 18, the position of the auxiliary exposure or black portion 37 may be varied within limits relative to the sound record.

The film record shown in Fig. 3 may if desired be used for reproducing purposes. Where a large number of duplicate records however are to be made it is preferable to print from this master film a mother film from which may be printed other films for reproducing purposes.

The apparatus which I have shown and described may form a part of re-recording mechanism in which case the record 15 is made from a former record. My invention moreover is not limited to records of the variable width type since by suitable well known means the sound track may be variably exposed over its entire width by light from both sources, thereby forming a record of the variable density type with which ground noise is reduced or substantially eliminated.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. The method of directly recording impulses corresponding to sound waves which comprises variably exposing the sound track of a light sensitive member in accordance with the form and amplitude of said impulses, and variably exposing otherwise unexposed portions of said sound track in response to the amplitude of said impulses.

2. The method of making a photographic record of the variable width type of impulses corresponding to sound waves by direct recording which comprises variably exposing a light sensitive member along one side of a record track thereof in response to said impulses and forming an envelope for the recorded peaks by variably exposing the member along the other side of the track thereof in response to the amplitude of said impulses.

3. The method of directly recording sound waves in a record track on a light sensitive member which comprises exposing the light sensitive member along one side of the track to a light beam varied in response to the form and volume of said waves, and exposing said member along the other side of the track to a second light beam varied in response to the volume of the sound.

4. Apparatus for directly recording sound in a record track on a moving light sensitive member, comprising means for variably exposing the member in said track in accordance with the form and amplitude of the sound waves and means for giving the member another variable exposure in the same track and at portions otherwise unexposed in accordance with the amplitude of the sound waves.

5. Apparatus for recording sound in a record track on a moving light sensitive member, comprising means for simultaneously projecting on the track of said member a plurality of light beams, means for varying one of said beams in accordance with the form and amplitude of the sound waves to be recorded and means for varying another of said beams in accordance with the amplitude of the sound waves.

6. Apparatus for recording sound in a record track on a moving light sensitive member, comprising means for projecting on the track of said member a plurality of light beams, means responsive to an alternating current corresponding with the sound waves for varying one of said beams in accordance with the form and amplitude of the waves, means for producing a direct current variable in accordance with the amplitude of said alternating current, and means for varying another of said beams in accordance with said direct current.

7. Apparatus for recording sound on a moving light sensitive member, comprising means for simultaneously projecting on said member a plurality of light beams, means for varying one of said beams in accordance with the sound waves to be recorded to form a variable width sound record, and means for varying another of said beams to cause an exposed area forming an envelope for the waves recorded by the first mentioned beam.

8. Apparatus for recording sound in a record track on a moving light sensitive member, comprising means including a galvanometer responsive to electrical waves corresponding to sound waves for exposing said member along said track, means including a second galvanometer for exposing said member along said track at portions thereof unexposed by said first mentioned means, and means connected in circuit with said second galvanometer for rectifying and damping said electrical waves.

9. Apparatus for recording sound on a moving film, comprising means including a galvanometer responsive to electrical waves corresponding to the sound waves arranged to vary the exposure of the film in a predetermined record track, means including a second galvanometer arranged to expose the film in the same track at portions thereof unexposed by said first mentioned means and at a point displaced longitudinally from the point of first exposure, and a rectifying and damping device in circuit with said second galvanometer whereby the second galvanometer causes an exposure of the film which varies with the amplitude of the sound waves and which is delayed to correspond in position on the film with the record of the sound waves.

10. The method of directly recording impulses corresponding to sound waves which comprises variably exposing the sound track of a light sensitive film in accordance with the form and amplitude of said impulses and variably exposing said sound track where not otherwise exposed also in accordance with the amplitude of said impulses.

11. The method of directly recording impulses corresponding to sound waves which comprises variably exposing the sound track of a light sensitive film in accordance with the form of said impulses and in direct proportion to their amplitude and variably exposing said sound track where not otherwise exposed in inverse proportion to the amplitude of said impulses.

12. The method of making a photographic record of impulses corresponding to sound waves by direct recording which comprises exposing the sound track of a light sensitive film in accordance with said impulses and separately exposing the sound track at portions thereof unaffected by the first mentioned exposure in response to the volume of the sound.

13. Apparatus for directly recording sound in a record track on a moving light sensitive film comprising means for variably exposing the film in said track in accordance with the form and amplitude of the sound, waves and means for separately exposing the film in the same track at otherwise unexposed portions thereof in accordance with the amplitude of the sound waves.

LEWIS T. ROBINSON.

CERTIFICATE OF CORRECTION.

Patent No. 1,935,417.

November 14, 1933.

LEWIS T. ROBINSON.

It is hereby certified that error appears in the printed specification of the above numbered patent requiring correction as follows: Page 2, line 12, for the patent number "1,649,335" read 1,640,335; and that the said Letters Patent should be read with this correction therein that the same may conform to the record of the case in the Patent Office.

Signed and sealed this 12th day of December, A. D. 1933.

F. M. Hopkins

Acting Commissioner of Patents.

(Seal)

a rectifying and damping device in circuit with said second galvanometer whereby the second galvanometer causes an exposure of the film which varies with the amplitude of the sound waves and which is delayed to correspond in position on the film with the record of the sound waves.

10. The method of directly recording impulses corresponding to sound waves which comprises variably exposing the sound track of a light sensitive film in accordance with the form and amplitude of said impulses and variably exposing said sound track where not otherwise exposed also in accordance with the amplitude of said impulses.

11. The method of directly recording impulses corresponding to sound waves which comprises variably exposing the sound track of a light sensitive film in accordance with the form of said impulses and in direct proportion to their amplitude and variably exposing said sound track where not otherwise exposed in inverse proportion to the amplitude of said impulses.

12. The method of making a photographic record of impulses corresponding to sound waves by direct recording which comprises exposing the sound track of a light sensitive film in accordance with said impulses and separately exposing the sound track at portions thereof unaffected by the first mentioned exposure in response to the volume of the sound.

13. Apparatus for directly recording sound in a record track on a moving light sensitive film comprising means for variably exposing the film in said track in accordance with the form and amplitude of the sound, waves and means for separately exposing the film in the same track at otherwise unexposed portions thereof in accordance with the amplitude of the sound waves.

LEWIS T. ROBINSON.

CERTIFICATE OF CORRECTION.

Patent No. 1,935,417.    November 14, 1933.

LEWIS T. ROBINSON.

It is hereby certified that error appears in the printed specification of the above numbered patent requiring correction as follows: Page 2, line 12, for the patent number "1,649,335" read 1,640,335; and that the said Letters Patent should be read with this correction therein that the same may conform to the record of the case in the Patent Office.

Signed and sealed this 12th day of December, A. D. 1933.

F. M. Hopkins

Acting Commissioner of Patents.

(Seal)

CERTIFICATE OF CORRECTION.

Patent No. 1,935,417.  November 14, 1933.

LEWIS T. ROBINSON.

It is hereby certified that error appears in the printed specification of the above numbered patent requiring correction as follows: Page 2, line 12, for the patent number "1,649,335" read 1,640,335; and that the said Letters Patent should be read with this correction therein that the same may conform to the record of the case in the Patent Office.

Signed and sealed this 12th day of December, A. D. 1933.

F. M. Hopkins (Seal)  Acting Commissioner of Patents.